United States Patent [19]

Tanaka et al.

[11] Patent Number: 4,669,367

[45] Date of Patent: Jun. 2, 1987

[54] LIGHT METAL ALLOY PISTON

[75] Inventors: Atsuo Tanaka; Yoshiaki Kajikawa; Yorishige Maeda, all of Toyota; Shiro Machida, Okazaki; Tadashi Dohnomoto, Toyota, all of Japan

[73] Assignee: Toyota Jidosha Kabushiki Kaisha, Toyota, Japan

[21] Appl. No.: 843,626

[22] Filed: Mar. 25, 1986

[30] Foreign Application Priority Data

Mar. 26, 1985 [JP] Japan ................................ 60-059414
Mar. 26, 1985 [JP] Japan ................................ 60-059415
Mar. 26, 1985 [JP] Japan ................................ 60-059416

[51] Int. Cl.[4] .............................. F02F 3/08; F16J 1/01
[52] U.S. Cl. .......................................... 92/227; 92/229
[58] Field of Search .................. 92/225, 227, 228, 229

[56] References Cited

U.S. PATENT DOCUMENTS 2,221,535 11/1940 Berry .................................... 92/229

FOREIGN PATENT DOCUMENTS 59-229033 12/1984 Japan .
59-229034 12/1984 Japan .
60-12650 1/1985 Japan .
60-28246 2/1985 Japan .
60-28247 2/1985 Japan .
60-28248 2/1985 Japan .

*Primary Examiner*—Allen M. Ostrager
*Attorney, Agent, or Firm*—Cushman, Darby & Cushman

[57] ABSTRACT

A light metal alloy cast piston including a thermal strut (32, 48, 52) arranged in a shoulder portion of the piston skirt. The thermal strut is composed of an annular fiber-reinforced metal portion in which high-tensile-strength reinforcing fibers are integrally molded. The reinforcing fibers include first fibers (34), such as carbon fibers, having a coefficient of linear expansion substantially smaller than that of the matrix metal alloy, and second fibers (36), such as silicon carbide fibers and alumina fibers, having a flexural or bending strength larger than that of the first fibers. The first fibers primarily serve to restrain thermal expansion of the piston skirt and the second fibers, having a larger bending strength, act to protect the first fibers from excessive bending forces. In a preferred embodiment, the first fibers are located in the inner region of the thermal strut and the second fibers are arranged in the outer region.

11 Claims, 7 Drawing Figures

LIGHT METAL ALLOY PISTON

BACKGROUND OF THE INVENTION

1. Field of the Invention

The present invention relates to a fiber-reinforced light metal alloy piston for internal combustion engines.

2. Description of the Related Art

It is well known to manufacture internal combustion engine pistons from light metal alloy castings such as aluminum alloys. Since light metal alloys have a larger coefficient of thermal expansion as compared with steel alloys, the skirt section of the light metal alloy piston is subjected to considerable thermal deformation between the cold start condition and the warmed up condition of the engine. If the piston skirt suction is so sized as to provide little clearance between the outer periphery thereof and the inner surface of the cylinder bore during cold start of the engine, then the friction between the piston skirt and the cylinder bore would become prohibitively high when the engine is warmed up, since the piston clearance in the bore is reduced due to thermal expansion of the piston skirt section. Conversely, if the clearance is large enough to avoid the above-mentioned problem, then the engine will generate piston slap to an unacceptable level during cold start of the engine, because of the excessive clearance between the piston skirt and cylinder bore. In order to meet these opposing requirements, it is desirable to suppress thermal expansion of the light metal alloy piston skirt section so that an optimum clearance is maintained regardless of the engine temperature.

One solution known in the art is to thermally isolate the skirt section from the heated piston crown section by means of a plurality of slits extending through the wall of the skirt perpendicular to the longitudinal axis of the piston. These slits communicate the oil ring groove with the inside of the piston and are primarily intended as oil passages serving to direct oil scraped from the surface of the cylinder bore by the oil control ring toward the interior of the piston. These slits have been found to act as a heat dam that prevents the transfer of heat from the piston crown to the skirt section. However, in high-speed high-power engines, the pistons tend to be subjected to increasingly high heat loads. Therefore, in such high power engines, it is desirable to dissipate heat through the piston skirt section, although most of the heat received by the piston crown from the combustion chamber is primarily transferred through piston rings to the engine cylinders. For this reason, the recent trend in high power engines is to reduce or even abolish the heat dam slits located between the piston crown and the skirt section. This causes the temperature of the skirt section to be elevated by 30° C. to 40° C. as compared with conventional non-supercharged engines, resulting in considerable thermal deformation of the skirt section.

Another solution is to provide within the skirt section a steel ring known as a "thermal strut" and having a high tensile strength sufficient to prevent thermal expansion of the piston skirt. The thermal strut is in the form of an insert and is molded within the matrix of the light metal alloy by an insert casting technique. The disadvantage of such a steel thermal strut is that it increases the weight of the piston and, thus, becomes a bar to designing light weight pistons.

It has been proposed, therefore, to use thermal struts made from fiber reinforced light metal alloys, instead of steel thermal struts, as disclosed, for example, in Japanese Unexamined Patent Publication (Kokai) Nos. 59-229033 and 59-229034, and Japanese Unexamined Utility Model Publication (Kokai) Nos. 60-12650, 60-28246, 60-28247, and 60-28248. The thermal strut of fiber reinforced light metal alloys comprises a circumferentially wound bundle of high-tensile-strength inorganic fibers, such as carbon fibers, which are integrally molded within a matrix light metal alloy to form an annular fiber-reinforced portion within the confinement of the shoulder portion of the skirt section. In the fiber reinforced portion, individual fibers are firmly bonded to the matrix metal. Due to the low coefficient of thermal expansion of the high tensile strength fibers, the annular fiber-reinforced portion serves as a thermal strut which precludes thermal expansion of the shoulder portion of the skirt section.

However, the problem which must be overcome in the design of light metal alloy casted pistons having thermal struts comprising high tensile strength carbon fibers is that cracks are formed in the metal matrix of the skirt shoulder portion along the boundary between the fiber reinforced metal portion and the non-reinforced metal matrix portion situated radially outwardly of the fiber reinforced portion, thereby causing breakage of the piston skirt. It is recognized that the formation of cracks is due, in the first place, to the low flexural or bending strength of carbon fibers. Carbon fibers are manufactured by carbonizing acrylic fibers and the like having polymer molecules highly oriented in the longitudinal direction of fibers and present a high tensile strength in the longitudinal direction. However, the shortcoming of carbon fibers as used to form thermal struts is that their resistance against transverse stress is quite insufficient. Thus, when the piston is repeatedly subjected to transverse stress due to explosive pulses imparted thereon during power strokes of the engine or due to thermal expansion and contraction as the piston is repeatedly heated and cooled in response to engine stopping and restarting, carbon fibers tend to break due to their poor flexural strength and the bondage between individual fibers and the matrix metal is lost, thereby leading to crack formation. It is believed that formation of cracks is due, in the second place, to a large difference between the coefficient of linear thermal expansion of carbon fibers and that of the matrix metal alloy. For example, the coefficient of linear expansion of aluminum alloy is on the order of $20\times10^{-6}/°$ C., whereas that of carbon fibers is about $-1.2\times10^{-6}/°$ C. Therefore, when the piston is repeatedly heated and cooled, the matrix metal located in the non-fiber-reinforced portion adjacent to and radially outward of the fiber reinforced portion undergoes a considerable amount of repeated expansion and contraction, whereas the matrix metal located in the fiber reinforced portion remains substantially free from such expansion because of restraint by reinforcing fibers. As a result, the matrix metal in the non-reinforced portion is subjected to a large stress which gives rise to cracks along the boundary between the fiber reinforced portion and the outer non-reinforced portion.

SUMMARY OF THE INVENTION

The object of the present invention is to provide a light metal alloy piston wherein thermal expansion of the skirt section is effectively precluded, yet avoiding the afore-mentioned problem of crack formation.

This invention provides a light metal alloy cast piston having a thermal strut arranged within the shoulder portion of the skirt section. The thermal strut comprises an annular fiber reinforced portion having a plurality of high tensile strength fibers integrally molded within the light metal alloy matrix. According to the invention, the reinforcing high tensile strength fibers comprise first fibers and second fibers. The first fibers have a coefficient of linear thermal expansion substantially smaller than that of the matrix light metal alloy, while the second fibers have a flexural or bending strength larger than that of the first fibers.

Preferably, the first fibers include carbon fibers and the second fibers include alumina fibers, aluminum silicate fibers, silicon carbide fibers, boron fibers, or steel fibers.

Carbon fibers exhibit an extremely high tensile strength and a very low coefficient of linear expansion necessary to prohibit thermal expansion of the skirt section. The second fibers have a flexural strength larger than the carbon fibers and serve to exempt the carbon fibers from being subjected to excessive transverse bending stresses. Thus, the combination of carbon fibers with second fibers having a larger bending strength enables provision of a thermal strut which is free from crack formation.

Preferably, the second fibers are located radially outwardly of the first fibers.

According to a preferred embodiment of the invention, the high-tensile-strength fibers forming the thermal strut are arranged in such a manner that the content by volume of the fibers in the fiber-reinforced portion gradually decreases radially outwardly. This means that the content of the reinforcing fibers is dense at the inner region of the fiber-reinforced portion and is sparse at the outer region thereof. Therefore, this arrangement allows the fibers molded within the outer region of the fiber-reinforced portion to be slightly expanded in response to thermal stress developed in the light metal alloy matrix of the above-mentioned outer region, whereby the apparent coefficient of linear thermal expansion of the outer region becomes close to the coefficient of expansion of the surrounding non-fiber reinforced portion. As a result, the difference between the amount of thermal expansion of the outer region of the strut and the amount of expansion of the adjacent non-reinforced matrix decreases, thereby avoiding the crack formation along the boundary therebetween. Another advantage of this arrangement is that the area of the interface which exists between the reinforcing fibers and the surrounding matrix metal and which would trigger formation of cracks due to loss of bondage therebetween is reduced at the outer region of the reinforced portion, thereby reducing the possibility of crack formation.

It has been recognized that in a light metal alloy piston having a thermal strut made of high tensile strength fibers, formation of cracks is also due to the presence of micro-cracks that have been created along the interfaces between the outer surfaces of individual fibers and the surrounding matrix metal due to breakage of bonding and release of the matrix metal from the fibers when excessive stress is applied to various parts of the piston. The present invention is also based on the finding that despite the presence of micro-cracks, the serious formation of cracks can be avoided by preventing the micro-cracks from connecting with each other to grow into larger cracks. Thus, according to another embodiment of the invention, the high tensile strength fibers are laid into a twisted yarn so that an imaginary tangential plane drawn to outer peripheral surface of an individual fiber is spirally twisted in the lengthwise direction. In this manner, a micro-crack that would be formed at a point on the fiber will be in a staggered relationship with another micro-crack on an adjacent fiber. Thus, it is possible to prevent two or more adjacent micro-cracks from joining to merge into a critical crack that would lead to failure of the piston. The bundle of fibers may comprise a plurality of twisted yarns, each of which in turn comprises a plurality of twisted individual high-tensile-strength fibers. In this case, it is expedient that the yarns and individual fibers be laid in opposite directions to reduce the area of outer surface of individual fibers that is coplanar with the general outer surface of each yarn.

DESCRIPTION OF THE PREFERRED EMBODIMENTS

Figure 1:
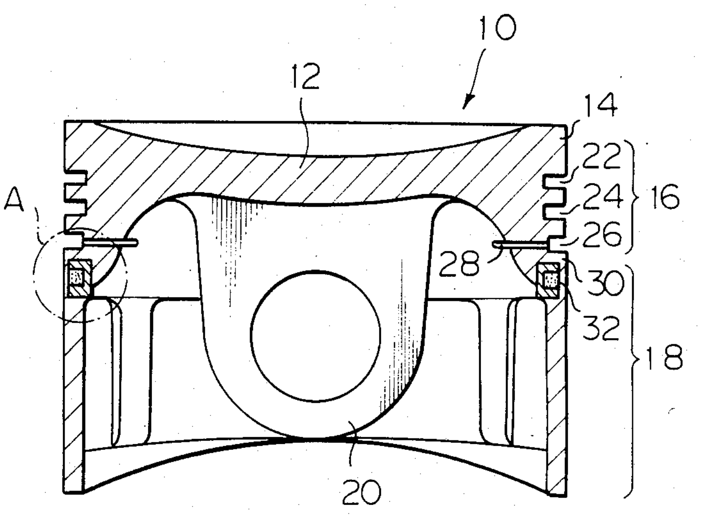
FIG. 1 is a cross-sectional view of the piston according to the first embodiment of the invention.

Referring to FIG. 1, wherein the first embodiment of the invention is shown, the piston 10 is made from a cast light metal alloy such as aluminum alloy. The piston 10 comprises a crown section 12, a top land section 14, a ring-belt section 16, a skirt section 18, and a pair of piston pin bosses, one of which is shown at 20. As well known in the art, the ring-belt section 16 is provided with a first and a second ring grooves 22 and 24 for compression rings and a third ring groove 26 for an oil control ring. The third ring groove 26 is communicated through a radial slot 28 with the inner cavity of the piston to inwardly direct the oil scraped by the oil control ring. The lower side wall of the third ring groove 26 defines a shoulder portion 30 of the skirt section 18. An annular thermal strut 32 is placed integrally within the mass of matrix light metal alloy forming the skirt section 18.

Figure 2:
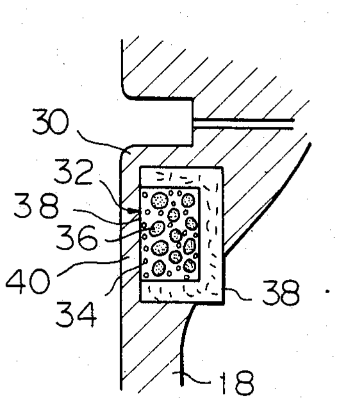
FIG. 2 is an enlarged cross-sectional view of the portion of the piston encircled by the dotted circle A in FIG. 1.

As shown enlarged in FIG. 2, the thermal strut 32 is composed of an annular fiber reinforced metal portion which is formed integrally within the skirt shoulder portion 30. The fiber reinforced metal portion forming the thermal strut 32 is spaced radially inwardly from the outer circumferential periphery of the skirt shoulder 30 so that it does not come into engagement with the cylinder bore when mounted in an engine. In the illustrated embodiment, the fiber-reinforced metal portion comprises two continuous yarns 34 and 36 of high tensile strength fibers. The yarn 34 includes carbon fibers having a coefficient of linear thermal expansion on the order of $-1.2\times10^{-6}/^{\circ}$ C. and having a diameter of about 5 to 10 μm. The other yarn 36 includes alumina fibers having a coefficient of linear thermal expansion on the order of $4\times10^{-6}/^\circ$ C. and having a flexural or bending strength greater than that of the carbon fibers. The diameter of individual alumina fibers is about 10 to 20 μm. In place of alumina fibers, the second yarn 36 may be composed of aluminum silicate fibers, silicon carbide fibers, boron fibers, or steel fibers. The yarns 34 and 36 comprise, respectively, several thousand individual fibers and are circularly wound within the confinement of the thermal strut 32 over 10 to 20 turns. The content by volume of the carbon fibers in the zone of the metal matrix reinforced by the carbon fibers is 60% to 65%, and the content by volume of the alumina fibers in their own zone is 40% to 50%. The yarns 34 and 36 are wound in such a manner that the volumetric ratio of the carbon fibers with respect to the alumina fibers is 1.5:1. The individual fibers are impregnated with the matrix light metal alloy and are firmly bonded therewith to form the integral fiber-reinforced portion. Although in FIG. 2 the thermal strut 32 is shown as having a rectangular cross-section delimited by a boundary indicated by the imaginary line 38, there is actually no definite boundary between the fiber-reinforced portion and the adjacent non-reinforced outer region 40 of the skirt shoulder 30.

The carbon fibers in the yarn 34 serve to restrain thermal expansion of the shoulder portion 30 of the piston due to their very low linear expansion coefficient and high tensile strength. The alumina fibers in the yarn 36 have a greater linear expansion coefficient than the carbon fibers and, thus, are less important in the expansion restraint function. However, the alumina fibers have a greater flexural strength and effectively protect the carbon fibers from excessive bending stresses, thereby avoiding the failure of the carbon fibers.

Figure 3:
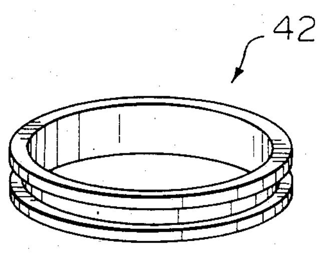
FIG. 3 is a perspective view of a yarn holder ring.

The fiber-reinforced portion forming the thermal strut 32 is formed in situ simultaneously with casting of the piston. Since the yarns of fibers are not sufficiently self-sustaining to retain their form during die casting, a grooved annular holder 42 as shown in FIG. 3 is used to support the yarns. The holder 42 may be made from chopped inorganic fibers, such as aluminum silicate fibers, bonded together by suitable inorganic binder to form a substantially rigid porous member containing less than 7% by volume of chopped fibers. The yarn 42 has a circumferentially extending groove in which the yarns 34 and 36 are wound. During die casting of the piston, the yarn holder 42 carrying the wound yarns is placed in position within a molding cavity of a die casting machine and a molten light metal alloy under a high pressure is filled therein. The molten metal fills the spaces between individual carbon fibers, alumina fibers, and chopped fibers to form the fiber-reinforced metal portion constituting the thermal strut 32.

Figure 4:
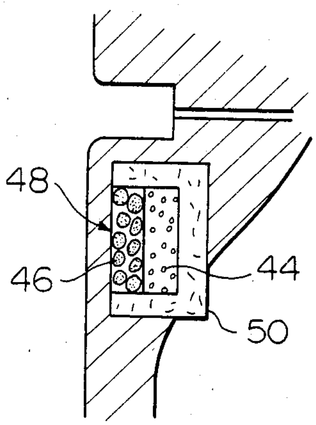
FIG. 4 is a cross-sectional view similar to FIG. 2 but showing another embodiment of the invention.

FIG. 4 shows the second embodiment of the invention. In this embodiment, the carbon fiber yarn 44 and the alumina fiber yarn 46 of the thermal strut 48 are wound in the groove of the yarn holder 50 in such a manner that the alumina fibers are situated radially outwardly of the carbon fibers. With this arrangement, the carbon fibers as wound around the yarn holder 50 is isolated by the layer of alumina fibers from the ambient atmosphere during preheating process wherein the assembly of the yarn holder and the wound yarns is subjected to preheating prior to die casting. During preheating, the interiorly located carbon fibers are held in a nitrogen rich environment due to the presence of the exterior alumina fiber layer. Thus, this arrangement prevents oxidation of carbon fibers during preheating and avoids degradation in the tensile strength of the thermal strut during casting. Furthermore, since the outwardly located alumina fibers are larger in diameter than the inside carbon fibers and are more self-sustaining, the outer layer of alumina fiber withstands the pressure applied thereon during injection of molten metal. Therefore, during die casting, the fibers are impregnated by the molten metal without disturbing their position, thereby providing stronger bondage between the reinforcing fibers and the matrix metal.

Figure 5:
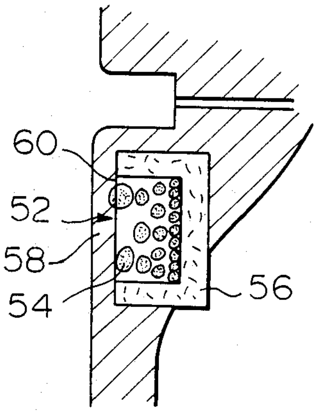
FIG. 5 is a cross-sectional view similar to FIG. 2 but showing a still other embodiment of the invention.

FIG. 5 illustrates the third embodiment of the invention. In this embodiment, the thermal strut 52 includes a single yarn 54 of carbon fibers. The yarn 54 is arranged within the circumferential groove of the yarn holder 56 in such a manner that the content by volume of the reinforcing fibers in the fiber-reinforced metal portion gradually decreases in the radially outward direction. Toward this end, prior to the die casting, the yarn 54 may be wound around the yarn holder 56 with a higher tension at the inner region and a gradually reduced tension as winding proceeds toward the outer region. As a result, the yarn 54 is wound tightly and densely at the inner region and loosely at the outer region to present the desired gradient of volumetric content. The apparent cross-sectional diameter of the yarn 54 increases radially outwardly, as shown schematically in FIG. 5. When the assembly of the yarn holder 56 and wound yarn 54 is insert molded by a die casting technique, the volumetric content of carbon fibers is smaller at the outer region of the fiber-reinforced metal portion. This allows the carbon fibers molded in the outer region to be slightly expanded when the skirt shoulder portion tends to undergo thermal expansion. Thus, the apparent coefficient of the outer region approaches that of the adjacent outer non-reinforced portion 58 to reduce the difference between the amount of linear expansion of the surrounding non-reinforced region 58, thereby avoiding development of thermal stress along the imaginary boundary 60 and preventing formation of cracks therealong. The reduction of the volumetric content of the reinforcing fibers at the outer region also results in a reduction in the surface area of the interface between the fibers and the matrix metal at the same outer region. This in turn reduces the possibility of crack formation.

Figure 6:
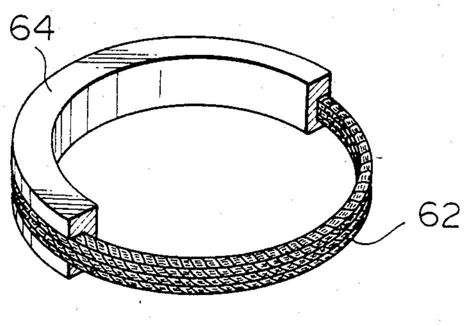
FIG. 6 is a perspective view of a fiber bundle as wound around the holder ring according to another embodiment of the invention, the holder ring being shown partly cut away.

In the fourth embodiment of the invention, individual reinforcing fibers are twisted into a yarn. A plurality of yarns are then laid together to form a twisted bundle 62 which is wound around the yarn holder 62 as shown in FIG. 6. The reinforcing fibers may be given 10 or more twists per meter thereof. However, when carbon fibers are used as reinforcing fibers, it is preferable that the number of twists per meter not exceed 30 in view of the low bending strength of carbon fibers. The assembly of the yarn holder 64 and the wound fiber bundle 62 is insert molded within the shoulder section of the piston skirt. With this arrangement, a micro-crack which is generated along the interface between the outer surface of a particular fiber and the surrounding matrix metal due to loss of bondage or release of the matrix metal from fiber would not merge with adjacent micro-cracks of adjacent fibers to develop into a larger crack because a plane tangential to the outer surface of an individual fiber is spirally distorted and extends in a staggered relationship with the tangential planes of adjacent fibers. This arrangement thus prevents micro-cracks from growing into large cracks which would cause failure of the piston. It is preferable that the yarns and the individual fibers be laid in the opposite directions to reduce the surface area of the fibers appearing on the surface of the yarn, thereby further preventing the growth of micro-cracks.

EXAMPLE 1

A yarn holder 42 as shown in FIG. 3 is first prepared. To this end, chopped aluminum silicate fibers, commercially available from Isolite Kogyo K.K. of Japan under the trademark "Kaowool", were dispersed in an aqueous medium containing suitable inorganic binder additives. The dispersion was filtered by vacuum filtration through a tubular mesh to form thereon a tubular aggregate of chopped fibers. The aggregate was dried, sintered, and machined to form the grooved yarn holder 42 having an outer diameter of 72.5 mm, an inner diameter of 65.5 mm, a wall thickness of 6 mm, and a groove of 3×2 mm.

Then, a yarn 34 having 6,000 carbon fibers, commercially available from Toray Inc. of Japan under the trade mark "Treca M40", and a yarn 36 of alumina fibers, available from Sumitomo Chemical Co., Ltd. of Japan, were wound around the holder 42 with a volumetric ratio of 1.5:1 to form a holder/yarn assembly. The assembly was preheated to 750° C. and was placed in position in a molding cavity of a high pressure die casting machine. A molten aluminum alloy (JIS AC 8A) was poured into the cavity and was pressurized by a plunger of the machine. After cooling, the casting was machined to form a piston 10 as shown in FIG. 1. The processes were repeated to obtain a plurality of pistons 10.

The pistons according to the invention were mounted on a six-cylinder 2000 cc gasoline engine. Light metal alloy pistons without thermal struts were prepared for the purpose of comparison and were mounted on a similar gasoline engine. Both engines were tested under a cold start condition and the engine noise measured. The measured noise level of the engine with the pistons according to the invention was lower by 3 dB than that of the engine provided with the pistons without thermal struts.

Next, pistons having thermal struts in which carbon fibers are exclusively used as reinforcing fibers were prepared for the purpose of comparative experiments. The pistons according to the invention and the pistons reinforced solely by carbon fibers were subjected to thermal shock tests wherein both pistons were heated to 350° C. in an electric furnace and were quenched in chilled water. In the carbon-fiber-reinforced pistons, fine cracks were observed in the skirt shoulder portion after 25 repeated heating and quenching cycles. However, no cracks were observed in the pistons according to the invention. It is believed that, in the pistons according to the invention, the bending strength of the thermal strut was considerably increased due to the presence of additional alumina fibers.

EXAMPLE 2

Yarn holders were prepared in the same manner as in Example 1. A carbon fiber yarn as used in Example 1 was first wound in the groove of the yarn holders up to two-thirds of the groove depth. Then, a yarn of silicon carbide fibers, available from Nippon Carbon K.K. under the trademark "Nicalon", was wound around the carbon fiber yarn for the remaining one-third of the groove depth to form holder/yarn assemblies. The assemblies were insert molded in the same manner as in Example 1 and subjected to machining to obtain pistons having thermal struts as shown in FIG. 4.

For comparison purpose, pistons having thermal struts including solely carbon fibers as reinforcing fibers were prepared.

Figure 7:
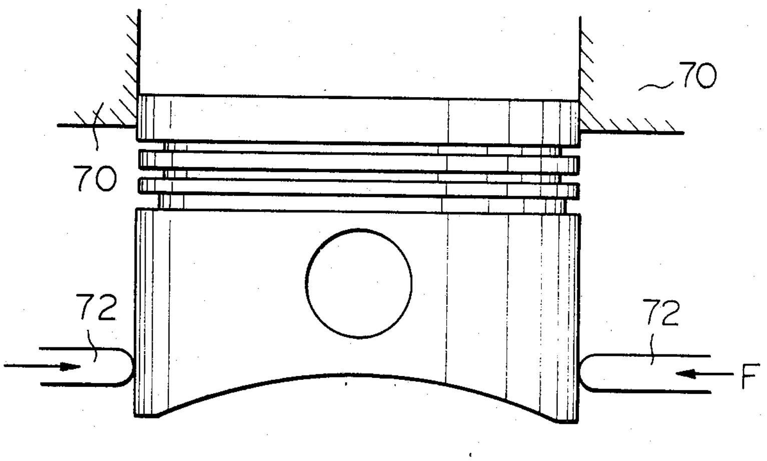
FIG. 7 is schematic representation of destructive tests.

Both kinds of pistons were subjected to destructive tests wherein respective pistons were chucked between jaws 70 of a chucking device and transverse pressure F was applied to the piston skirt by plungers 72 as shown in FIG. 7. As compared with the pistons having thermal struts reinforced solely by carbon fibers, the pistons according to the invention were able to withstand a breaking load which was higher by 50%, thereby proving a high mechanical strength.

EXAMPLE 3

Yarn holders similar to Example 1 were prepared. A carbon fiber yarn as used in Example 1 was wound around the yarn holders by a yarn winder. Tension of the yarn winder was controlled in such a manner that the yarn was first wound for a thickness of 1.6 mm at a volumetric content of about 65% and then wound for a thickness of 0.4 mm at a volumetric content of 40%. The thus prepared holder/yarn assemblies were preheated to a temperature of 750° C. and held in position in a cavity of a high pressure die casting machine. A molten aluminum alloy (JIS AC8A) of 740° C. was poured into the cavity to obtain casted pistons, which were machined and heat treated to form pistons with thermal struts as shown in FIG. 5.

Another series of pistons were prepared in which carbon fiber yarn was wound at a uniform volumetric content of 65% throughout the depth of groove of the holder.

These pistons were subjected to thermal shock tests similar to Example 2. It was observed that, in the pistons having a uniform volumetric content of fibers, cracks were generated along the boundary 60 (FIG. 5) after 20 heating and quenching cycles. However, in the pistons according to the invention, no crack formation was observed even after 30 heating and quenching cycles.

EXAMPLE 4

Yarn holders were prepared in the same manner as in Example 1. A carbon fiber yarn similar to that used in Example 1 was first twisted to form 15 twists per meter. The twisted yarn was then wound around the yarn holders for 20 turns at a volumetric content of about 60%. The thus formed holder/yarn assemblies were insert molded by a die casting machine. The castings were machined and heat treated to obtain pistons having thermal struts of twisted yarn.

Comparative tests were conducted wherein the pistons according to the invention and the pistons having thermal struts with non-twisted carbon fiber yarns were subjected to thermal shock cycles as in the preceding examples. In the pistons having non-twisted yarn thermal struts, cracks were formed along the cylindrical boundary between the fiber-reinforced region and the non-reinforced matrix region after about 12 heating and quenching cycles. However, in the pistons according to the invention no crack formation was observed until after about 25 thermal shock cycles.

These two kinds of pistons were mounted on six cylinder 2000 cc gasoline engines. The engines were operated under a cold start condition. Engine noise was measured, but no appreciable difference was observed between the noise level of these two engines.

EXAMPLE 5

Three twisted yarns of Example 4 were further laid into a strand by twisting each yarn in the direction opposite to the direction of twisting of individual carbon fibers. The thus laid strand was wound around similar yarn holders for several turns to form holder/yarn assemblies which were then insert molded in a die casting machine to form aluminum alloy cast pistons. The thus obtained pistons were subjected to thermal shock tests as in the preceding examples. No formation of cracks was observed until about 35 heating and quenching cycles.

What is claimed is:

1. A light metal alloy cast piston for an internal combustion engine, said piston having an annular thermal strut arranged within and along a shoulder portion of a skirt section thereof for suppressing thermal expansion of said skirt section, said thermal strut being spaced radially inwardly from the outer periphery of said shoulder portion, said thermal strut including an annular fiber-reinforced metal portion having a plurality of circumferentially wound continuous high-tensile-strength reinforcing fibers integrally molded within a light metal alloy matrix forming said piston, said piston being characterized in that said high-tensile-strength reinforcing fibers comprise first and second fibers, said first fibers having a coefficient of linear thermal expansion substantially smaller than that of said matrix light metal alloy, said second fibers having a flexural strength larger than that of said first fibers.

2. A piston according to claim 1, wherein said first fibers are carbon fibers.

3. A piston according to claim 2, wherein said second fibers are made from a material selected from the group consisting of alumina, aluminum silicate, silicon carbide, boron, and steel.

4. A piston according to claim 3, wherein said second fibers are located radially outwardly of said first fibers.

5. A piston according to claim 4, wherein said reinforcing fibers are wound in such a manner that the content by volume thereof in said fiber reinforced portion gradually decreases radially outwardly.

6. A piston according to claim 4, wherein said reinforcing fibers are twisted into a yarn which is circumferentially wound through a plurality of turns.

7. A piston according to claim 4, wherein said reinforcing fibers are twisted into a plurality of yarns which are in turn twisted into a bundle which is circumferentially wound through a plurality of turns.

8. A piston according to claim 7, wherein said yarns and individual fibers are laid in opposite directions.

9. A fiber-reinforced light metal alloy cast piston for an internal combustion engine, said piston having an annular thermal strut for suppressing thermal expansion of a skirt section thereof, said thermal strut including an annular fiber-reinforced metal portion having a circularly wound bundle of continuous high-tensile-strength reinforcing fibers integrally molded within a light metal alloy matrix forming said piston, said fiber-reinforced metal portion being arranged within and along a shoulder portion of said skirt section and spaced radially inwardly from the outer periphery of said skirt section, said piston being characterized in that said bundle of reinforcing fibers is wound in such a manner that the volumetric content of said fibers in said reinforced portion gradually decreases radially outwardly from the radially inner side of said strut to the radially outer side thereof.

10. A light metal alloy cast piston for an internal combustion engine, said piston having an annular thermal strut for suppressing thermal expansion of a skirt section thereof, said thermal strut being arranged within a shoulder portion of said skirt section and spaced radially inward from the outer periphery of said skirt section, said thermal strut including an annular fiber-reinforced metal portion having a circumferentially wound bundle of continuous high-tensile-strength reinforcing fibers integrally molded within a light metal alloy matrix forming said piston, said piston being characterized in that said bundle comprises a plurality of twisted yarns, each of which comprises a plurality of twisted high-tensile-strength fibers.

11. A piston according to claim 10, wherein said yarns are laid in the direction opposite to the direction of twisting of said individual fibers.

* * * * *